US012287847B2

(12) United States Patent
Tran et al.

(10) Patent No.: US 12,287,847 B2
(45) Date of Patent: Apr. 29, 2025

(54) SYSTEMS AND METHODS FOR ARTIFICIAL FACIAL IMAGE GENERATION CONDITIONED ON DEMOGRAPHIC INFORMATION

(71) Applicant: IDS Technology, LLC, Arlington, VA (US)

(72) Inventors: Tung Thanh Tran, Bradenton, FL (US); Dongwook Shin, Potomac, MD (US); Jefferson D. Hoye, Arlington, VA (US); Matthew R. Ehlers, Raleigh, NC (US)

(73) Assignee: IDS TECHNOLOGY LLC, Arlington, VA (US)

( * ) Notice: Subject to any disclaimer, the term of this patent is extended or adjusted under 35 U.S.C. 154(b) by 393 days.

(21) Appl. No.: 17/524,475

(22) Filed: Nov. 11, 2021

(65) Prior Publication Data

US 2022/0147769 A1     May 12, 2022

Related U.S. Application Data

(60) Provisional application No. 63/112,323, filed on Nov. 11, 2020.

(51) Int. Cl.
  *G06F 18/21*     (2023.01)
  *G06F 18/214*    (2023.01)
  (Continued)

(52) U.S. Cl.
  CPC ........ *G06F 18/214* (2023.01); *G06F 18/2431* (2023.01); *G06T 11/00* (2013.01)

(58) Field of Classification Search
  CPC .... G06F 18/214; G06F 18/2431; G06T 11/00; G06V 10/82; G06V 40/178
  (Continued)

(56) References Cited

U.S. PATENT DOCUMENTS

| 7,505,621 B1 * | 3/2009 | Agrawal | G06V 40/172 |
| | | | 382/226 |
| 11,335,120 B2 * | 5/2022 | Cole | G06V 40/168 |

(Continued)

FOREIGN PATENT DOCUMENTS

| CN | 108108711 A | * | 6/2018 | ......... G06K 9/00268 |
| CN | 112784631 | * | 5/2021 | ........... G06F 18/214 |

OTHER PUBLICATIONS

Extended European Search Report and Search Opinion issued in related Application Serial No. 21892783.8 on Aug. 22, 2024.
(Continued)

*Primary Examiner* — Neil R McLean
(74) *Attorney, Agent, or Firm* — Brian J. Colandreo; Heath M. Sargeant; Holland & Knight LLP

(57) ABSTRACT

A method, computer program product, and computer system for analyzing, by a computing device, a plurality of facial images to determine a plurality of demographic labels associated with each facial image of the plurality of facial images. A model may be trained based upon, at least in part, the plurality of demographic labels associated with each facial image of the plurality of facial images. An input of at least a portion of the plurality of demographic labels may be received. An artificially generated facial image may be provided for display that is generated based upon, at least in part, the model and the input.

21 Claims, 9 Drawing Sheets

(51) Int. Cl.
*G06F 18/2431* (2023.01)
*G06T 11/00* (2006.01)

(58) Field of Classification Search
USPC .......................................................... 382/159
See application file for complete search history.

(56) References Cited

U.S. PATENT DOCUMENTS

2014/0185926 A1* 7/2014 Ricanek, Jr. ......... G06V 40/172
382/159
2020/0219295 A1* 7/2020 el Kaliouby ............ G06T 11/00

OTHER PUBLICATIONS

Wang, Tianren et al., "Faces la Carte: Text-to-Face Generation via Attribute Disentanglement", arXiv. Organization, Cornell University Library Itaca, NY 14853, Sep. 18, 2020.
Li, Shan et al., "Deep Facial Expression Recognition: A Survey", IEEE Transactions on Affective Computing, Mar. 17, 2020.
Gao, Chenqiang et al., "Face Liveness Detection Based on the Improved CNN with Context and Texture Information", Chinese Journal of Electronics, Technology Exchange LTD., Hong Kong, HK, vol. 28, Nov. 1, 2019, pp. 1092-1098.

* cited by examiner

FIG. 9

SYSTEMS AND METHODS FOR ARTIFICIAL FACIAL IMAGE GENERATION CONDITIONED ON DEMOGRAPHIC INFORMATION

RELATED CASES

This application claims the benefit of U.S. Provisional Application No. 63/112,323 filed on 11 Nov. 2020, the contents of which are all incorporated by reference.

BACKGROUND

Artificial Intelligence (AI)-facilitated image generation has reached an unprecedented level of advancement in recent years and may now be capable of generating photo-realistic imitations of many different things.

BRIEF SUMMARY OF DISCLOSURE

In one example implementation, a method, performed by one or more computing devices, may include but is not limited to analyzing, by a computing device, a plurality of facial images to determine a plurality of demographic labels associated with each facial image of the plurality of facial images. A model may be trained based upon, at least in part, the plurality of demographic labels associated with each facial image of the plurality of facial images. An input of at least a portion of the plurality of demographic labels may be received. An artificially generated facial image may be provided for display that is generated based upon, at least in part, the model and the input.

One or more of the following example features may be included. The demographic labels may include at least one of a gender, an age, and an ethnicity. The age may be based upon, at least in part, a weighted blending of age labels of the plurality of demographic labels. The ethnicity may be based upon, at least in part, a weighted blending of ethnicity labels of the plurality of demographic labels. The plurality of facial images may be automatically selected for analysis from an internet. It may be determined whether a candidate face image is acceptable for use as one of the plurality of facial images to train the model based upon, at least in part, at least one of whether the candidate face image is a real human face and one or more attributes of the candidate face image. The model may be trained to automatically assign the demographic labels to the plurality of facial images.

In another example implementation, a computing system may include one or more processors and one or more memories configured to perform operations that may include but are not limited to analyzing a plurality of facial images to determine a plurality of demographic labels associated with each facial image of the plurality of facial images. A model may be trained based upon, at least in part, the plurality of demographic labels associated with each facial image of the plurality of facial images. An input of at least a portion of the plurality of demographic labels may be received. An artificially generated facial image may be provided for display that is generated based upon, at least in part, the model and the input.

One or more of the following example features may be included. The demographic labels may include at least one of a gender, an age, and an ethnicity. The age may be based upon, at least in part, a weighted blending of age labels of the plurality of demographic labels. The ethnicity may be based upon, at least in part, a weighted blending of ethnicity labels of the plurality of demographic labels. The plurality of facial images may be automatically selected for analysis from an internet. It may be determined whether a candidate face image is acceptable for use as one of the plurality of facial images to train the model based upon, at least in part, at least one of whether the candidate face image is a real human face and one or more attributes of the candidate face image. The model may be trained to automatically assign the demographic labels to the plurality of facial images.

In another example implementation, a computer program product may reside on a computer readable storage medium having a plurality of instructions stored thereon which, when executed across one or more processors, may cause at least a portion of the one or more processors to perform operations that may include but are not limited to analyzing a plurality of facial images to determine a plurality of demographic labels associated with each facial image of the plurality of facial images. A model may be trained based upon, at least in part, the plurality of demographic labels associated with each facial image of the plurality of facial images. An input of at least a portion of the plurality of demographic labels may be received. An artificially generated facial image may be provided for display that is generated based upon, at least in part, the model and the input.

One or more of the following example features may be included. The demographic labels may include at least one of a gender, an age, and an ethnicity. The age may be based upon, at least in part, a weighted blending of age labels of the plurality of demographic labels. The ethnicity may be based upon, at least in part, a weighted blending of ethnicity labels of the plurality of demographic labels. The plurality of facial images may be automatically selected for analysis from an internet. It may be determined whether a candidate face image is acceptable for use as one of the plurality of facial images to train the model based upon, at least in part, at least one of whether the candidate face image is a real human face and one or more attributes of the candidate face image. The model may be trained to automatically assign the demographic labels to the plurality of facial images.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Figure 9:
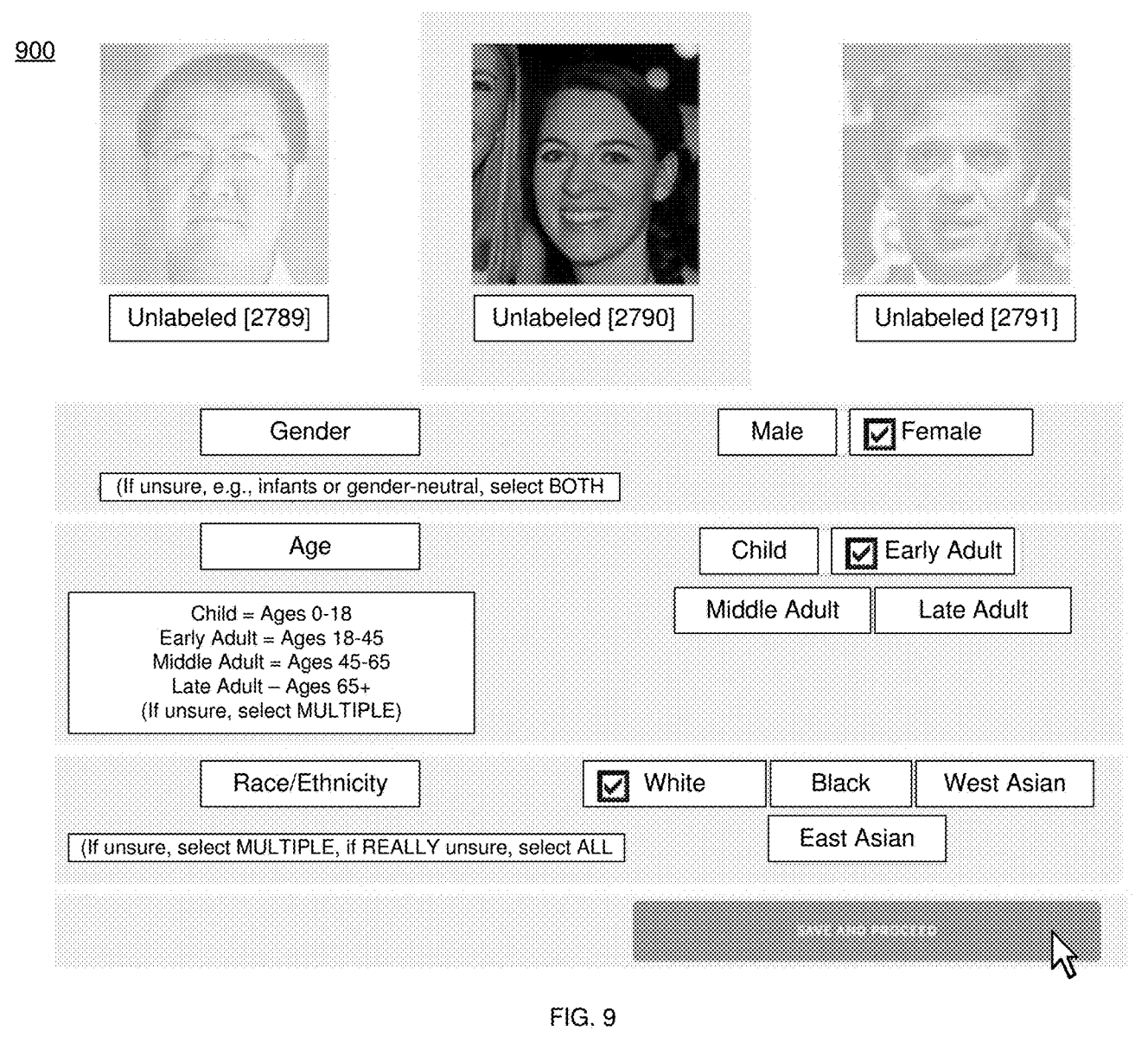

FIG. 9 is an example diagrammatic view of a user interface of a facial image generator process according to one or more example implementations of the disclosure.

Like reference symbols in the various drawings may indicate like elements.

DETAILED DESCRIPTION

Figure 1:
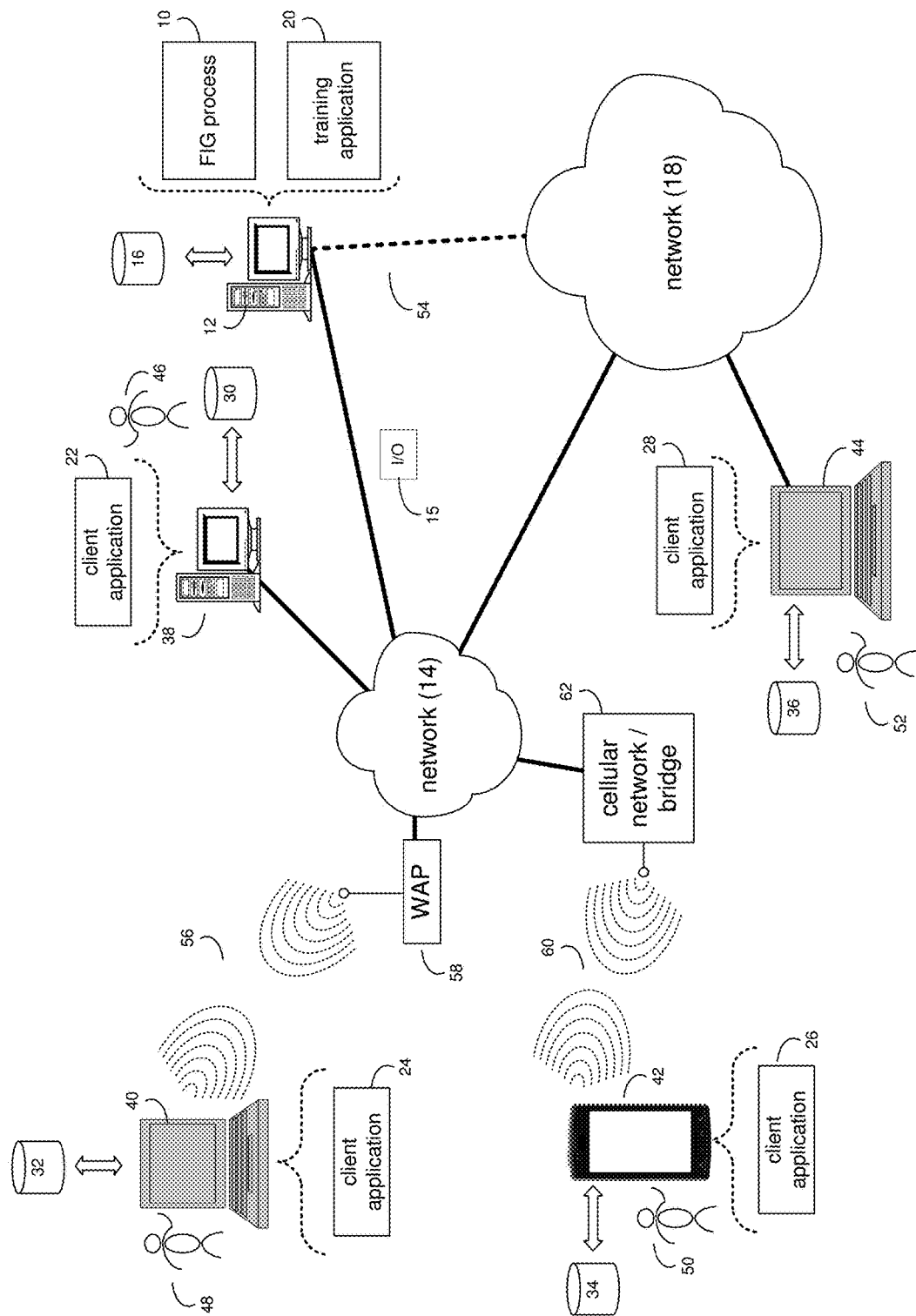
FIG. 1 is an example diagrammatic view of a facial image generator process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN), a wide area network (WAN), a body area network BAN), a personal area network (PAN), a metropolitan area network (MAN), etc., or the connection may be made to an external computer (for example, through the internet using an Internet Service Provider). In some implementations, electronic circuitry including, for example, programmable logic circuitry, an application specific integrated circuit (ASIC), field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown facial image generator process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). A SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a facial image generator process, such as facial image generator process 10 of FIG. 1, may analyze, by a computing device, a plurality of facial images to determine a plurality of demographic labels associated with each facial image of the plurality of facial images. A model may be trained based upon, at least in part, the plurality of demographic labels associated with each facial image of the plurality of facial images. An input of at least a portion of the plurality of demographic labels may be received. An artificially generated facial image may be provided for display that is generated based upon, at least in part, the model and the input.

In some implementations, the instruction sets and subroutines of facial image generator process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, facial image generator process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a training application (e.g., training application 20), examples of which may include, but are not limited to, e.g., an AI model training application, a web crawling application, or other application that allows for the training of models and/or image gathering for training of models for image generation. In some implementations, facial image generator process 10 and/or training application 20 may be accessed via one or more of client applications 22, 24, 26, 28. In some implementations, facial image generator process 10 may be a standalone application, or may be an applet/application/script/extension that may interact with and/or be executed within training application 20, a component of training application 20, and/or one or more of client applications 22, 24, 26, 28. In some implementations, training application 20 may be a standalone application, or may be an applet/application/script/extension that may interact with and/or be executed within facial image generator process 10, a component of facial image generator process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of facial image generator process 10 and/or training application 20. Examples of client applications 22, 24, 26, 28 may include, but are not limited to, e.g., an AI model training application, a web crawling application, or other application that allows for the training of models and/or image gathering for training of models for image generation, a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., audio/video, photo, etc.) capturing and/or output device, an audio input and/or recording device (e.g., a handheld microphone, a lapel microphone, an embedded microphone (such as those embedded within eyeglasses, smart phones, tablet computers and/or watches, etc.), and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of facial image generator process 10 (and vice versa). Accordingly, in some implementations, facial image generator process 10 may be a purely server-side application, a purely client-side application, or a hybrid server-side/client-side application that is cooperatively executed by one or more of client applications 22, 24, 26, 28 and/or facial image generator process 10.

In some implementations, one or more of client applications 22, 24, 26, 28 may be configured to effectuate some or all of the functionality of training application 20 (and vice versa). Accordingly, in some implementations, training application 20 may be a purely server-side application, a purely client-side application, or a hybrid server-side/client-side application that is cooperatively executed by one or more of client applications 22, 24, 26, 28 and/or training application 20. As one or more of client applications 22, 24, 26, 28, facial image generator process 10, and training application 20, taken singly or in any combination, may effectuate some or all of the same functionality, any description of effectuating such functionality via one or more of client applications 22, 24, 26, 28, facial image generator process 10, training application 20, or combination thereof, and any described interaction(s) between one or more of client applications 22, 24, 26, 28, facial image generator process 10, training application 20, or combination thereof to effectuate such functionality, should be taken as an example only and not to limit the scope of the disclosure.

In some implementations, one or more of users 46, 48, 50, 52 may access computer 12 and facial image generator process 10 (e.g., using one or more of client electronic devices 38, 40, 42, 44) directly through network 14 or through secondary network 18. Further, computer 12 may be connected to network 14 through secondary network 18, as illustrated with phantom link line 54. Facial image generator process 10 may include one or more user interfaces, such as browsers and textual or graphical user interfaces, through which users 46, 48, 50, 52 may access facial image generator process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy)

is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12 (and vice versa). Examples of I/O request 15 may include but are not limited to, data write requests (e.g., a request that content be written to computer 12) and data read requests (e.g., a request that content be read from computer 12).

Figure 2:
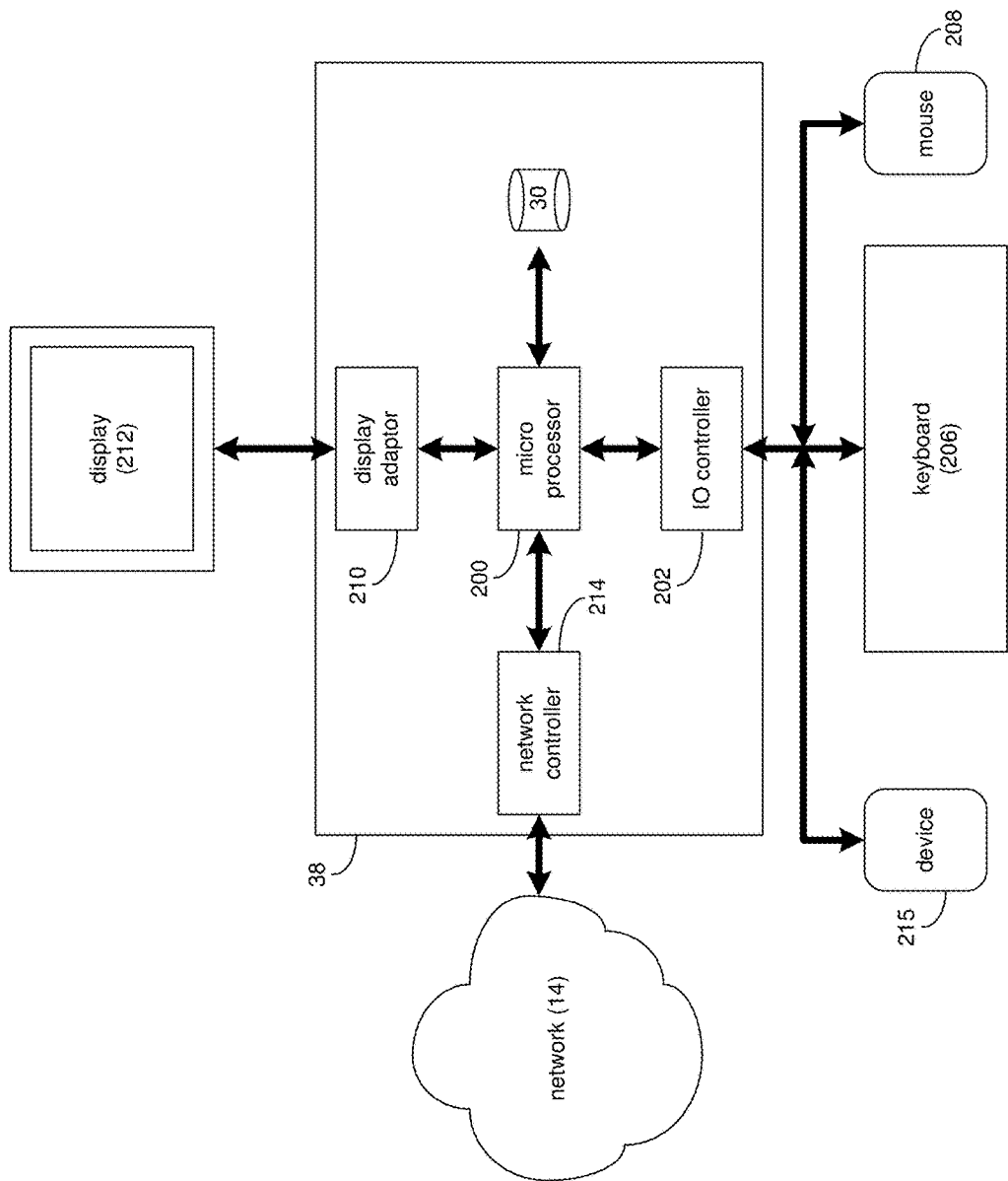
FIG. 2 is an example diagrammatic view of a computer/storage target/client electronic device of FIG. 1 according to one or more example implementations of the disclosure.
Figure 3:
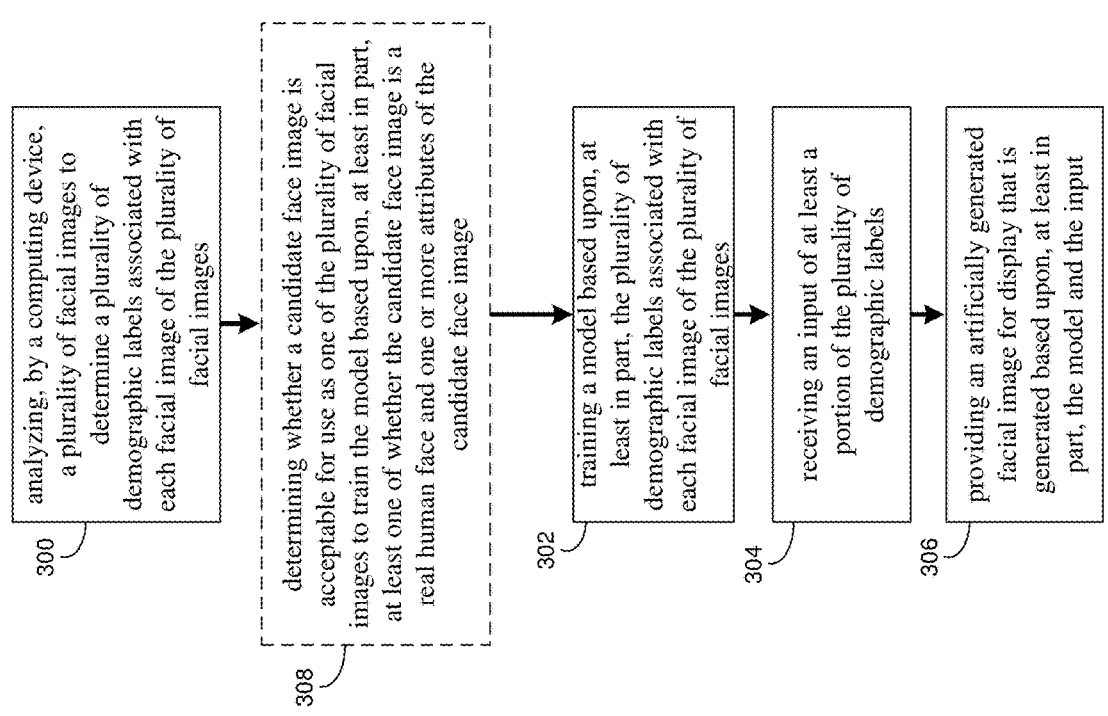
FIG. 3 is an example flowchart of a facial image generator process according to one or more example implementations of the disclosure.

Referring also to the example implementation of FIG. 2, there is shown a diagrammatic view of client electronic device 38. While client electronic device 38 is shown in this figure, this is for example purposes only and is not intended to be a limitation of this disclosure, as other configurations are possible. Additionally, any computing device capable of executing, in whole or in part, facial image generator process 10 may be substituted for client electronic device 38 (in whole or in part) within FIG. 2, examples of which may include but are not limited to computer 12 and/or one or more of client electronic devices 38, 40, 42, 44.

In some implementations, client electronic device 38 may include a processor (e.g., microprocessor 200) configured to, e.g., process data and execute the above-noted code/instruction sets and subroutines. Microprocessor 200 may be coupled via a storage adaptor to the above-noted storage device(s) (e.g., storage device 30). An I/O controller (e.g., I/O controller 202) may be configured to couple microprocessor 200 with various devices (e.g., via wired or wireless connection), such as keyboard 206, pointing/selecting device (e.g., touchpad, touchscreen, mouse 208, etc.), custom device (e.g., device 215), USB ports, and printer ports. A display adaptor (e.g., display adaptor 210) may be configured to couple display 212 (e.g., touchscreen monitor(s), plasma, CRT, or LCD monitor(s), etc.) with microprocessor 200, while network controller/adaptor 214 (e.g., an Ethernet adaptor) may be configured to couple microprocessor 200 to the above-noted network 14 (e.g., the Internet or a local area network).

Artificial Intelligence (AI)-facilitated image generation has reached an unprecedented level of advancement in recent years and may now be capable of generating photo-realistic imitations of many different things, such as buildings, animals, automobiles, and even human faces that are nearly indistinguishable from the real thing. This is facilitated by a range of technological advancements in the broad field of machine learning, including larger models, more sophisticated and efficient neural network architectures, and the revolutionary paradigm known as generative adversarial networks (or GANs). In GANs, the learning process is generally guided by an adversarial mechanism involving two distinct models, e.g., the generator and the discriminator. The generator is generally tasked with generating synthetic images that resemble the real thing, while the discriminator is generally tasked with distinguishing between synthetic images and real image. Thus, the learning process may be a zero-sum game, whereby the generator only improves at the expense of the discriminator, and vice-versa. Training such a system is inherently unstable, but it is possible to reach a delicate balance whereby both the generator and discriminator are able to learn from each other and improve over time. At deployment time, only the generator is needed, while the discriminator is discarded. Some state-of-the-art systems in image generation today is known as StyleGAN, which is understood to be designed using style transfer techniques that allow for mixing of different "styles" (e.g., features or effects) at various levels of detail. While StyleGAN may be capable of generating extremely high-fidelity images, it is considered an "unconditional" model; in other words, as described, there is no clear way to directly and conveniently control the image generation process without manipulating the latent code. As such, as will be described in greater detail below, the present disclosure may be an improvement of known systems (e.g., StyleGAN) that may allow for direct control of human face image generation over example and non-limiting dimensions: gender, age, and ethnicity (and, by extension, nationality). Additionally, the present disclosure may also describe an end-to-end system for the automatic acquisition of new labeled training data for model training and development.

The Facial Image Generator Process:

As discussed above and referring also at least to the example implementations of FIGS. 3-9, facial image generator (FIG) process 10 may analyze 300, by a computing device, a plurality of facial images to determine a plurality of demographic labels associated with each facial image of the plurality of facial images. FIG process 10 may train 302 a model based upon, at least in part, the plurality of demographic labels associated with each facial image of the plurality of facial images. FIG process 10 may receive 304 an input of at least a portion of the plurality of demographic labels. FIG process 10 may provide 306 an artificially generated facial image for display that is generated based upon, at least in part, the model and the input.

In some implementations, FIG process 10 may analyze 300 a plurality of facial images to determine a plurality of demographic labels associated with each facial image of the plurality of facial images, and in some implementations, the demographic labels may include at least one of a gender, an age, and an ethnicity. For example, in some implementations, FIG process 10 may take as its input demographic information including, but not limited to, gender, age, and ethnicity (or nationality which may be used interchangeably with ethnicity) and may return an artificially generated face that approximately matches the desired input description. In some implementations, unlike other systems, while it is trained on a selection of very coarse categories, the synthetic images generated by FIG process 10 may be conditioned on very fine-grained input labels. For example, while capable of training on broad age labels (or age ranges) such as young adult, middle adult, and late adult, it may be possible to generate a face conditioned on an exact numeric age, with believable precision, by leveraging the smooth style-mixing effects of StyleGAN. This label mixing idea may also be applied to broad ethnicity labels (e.g., White, Black, West Asian, East Asian, etc.) to approximate ethnicities of mixed ancestry. When nationality, instead of ethnicity, is specified, a mapping step may be applied wherein an appropriate ethnicity label may be assigned based on publicly available data about the ethnic distributions of the target country. Other non-demographic information may also be used to more finely control the generation process or provide variations of the same face include, e.g., head orientation, facial expression, lighting, and background scenery. It will be appreciated that various other types of demographic and/or non-demographic information may also be used, as well as information used singly or in any combination without departing from the scope of the present disclosure.

In some implementations, the plurality of facial images may be automatically selected for analysis from an internet. For example, the data analyzed for training the GAN model (discussed further below) may be curated from private/ publicly available image repositories or from the open internet. The system for acquiring new training examples may be based on analyzing raw images, regardless of source or origin, for real human faces. These raw images may be retrieved via, e.g., crawling (e.g., via FIG process 10) the open internet or sourced from a relevant repository of photographic images or dataset. Concretely, each raw image may first be analyzed via a face detection system (e.g., via FIG process 10) that extracts bounding-box coordinates for each detected face. Each detected face may then be cropped using bounding-box information, with the cropped face image checked and assessed for quality via a machine learning (ML) model (e.g., via FIG process 10) such that low-quality images are discarded, discussed further below. Examples of low-quality images may include but are not limited to those that are blurry, low-resolution, or have visual obstructions. Face images not deemed low-quality may be kept and processed by yet another ML model (e.g., via FIG process 10) that is designed and trained to annotate face images with demographic information. Concretely, this second ML model may assign a set of labels to an extracted face image describing the observable gender, age, and ethnicity of the face, which together constitutes a new discrete training example. The method for building and training these intermediate ML models is also detailed further below. Thus, FIG process 10 may be a comprehensive description of a GAN-based model for face generation conditioned on input demographic information, and an end-to-end system (e.g., via FIG process 10) for automatically obtaining abundant amounts of training data that enable the stable and effective training of such models.

In some implementations, FIG process 10 may train 302 a model based upon, at least in part, the plurality of demographic labels associated with each facial image of the plurality of facial images. For example, in some implementations, to effectively train the model, vast amounts of data associating real faces with their demographic information may be needed. This example method may focus specifically on gender, age, and ethnicity (and by extension for use interchangeably, nationality). The example categories available for each field are as follows. For gender, the two categories may be Male and Female. For age, the three categories may be: Early Aged Adult (ages 18-45), Middle-Aged Adult (ages 45-65), and Late-Aged Adult (65+), although it will be appreciated that other age ranges, as well as absolute ages, may be used. Finally, for ethnicity, the four categories may be White, Black, West Asian, and East Asian, although other categories may be used. These categories may be intentionally broad to allow for the highest chance of success, as each additional category for any field increases the number of unique label combination exponentially, thus increasing the potential for model overfitting and training instability.

Figure 4:
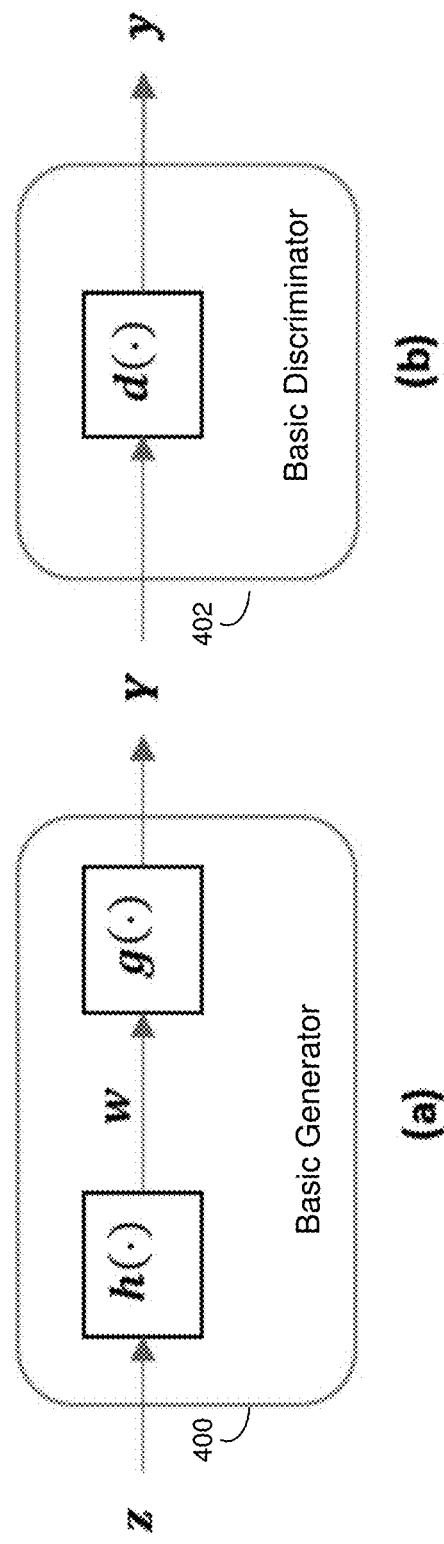
FIG. 4 is an example diagrammatic view of a GAN generator and a GAN discriminator that may be used by a facial image generator process according to one or more example implementations of the disclosure.

Referring at least to the example implementation of FIG. 4, a basic generator 400 of FIG process 10 and a basic discriminator 402 of FIG process 10 are shown. In the example, first, a (square) image can be represented as an n×n×3 tensor, where the last dimension corresponds to color channel (e.g., RGB: red, green, and blue).

Basic generator 400 (also referred to as basic GAN generator of FIG process 10) acts as a function of a noise vector z which maps to a uniquely rendered face. It may consist of two abstract components, e.g., the mapping layer h(•), which maps the noise vector to an intermediate representation w needed for hierarchical style-based image generation, and the synthesis layer g(•) which generates an image based on the aforementioned representation w. In some implementations, to adequately describe the model architecture, FIG process 10 may deconstruct the StyleGAN generator into two core components and abstract them away as mathematical functions: the mapping layer of FIG process 10, defined as $h(\bullet): \mathbb{R}^d \mapsto \mathbb{R}^d$, and the synthesis layer, defined as $g(\bullet): \mathbb{R}^d \mapsto \mathbb{R}^{n \times n \times 3}$, where d is the dimension of the intermediate latent representations (i.e., the "latent code"), and n is the dimensionality of the final image. The mapping component h(•) takes some latent code z and maps it to a latent code w of the same dimension. Thus, in the original StyleGAN architecture, the image generated that is represented by the tensor Y∊$\mathbb{R}^{n \times n \times 3}$ can be computed as Y=g(h(z)).

Figure 5:
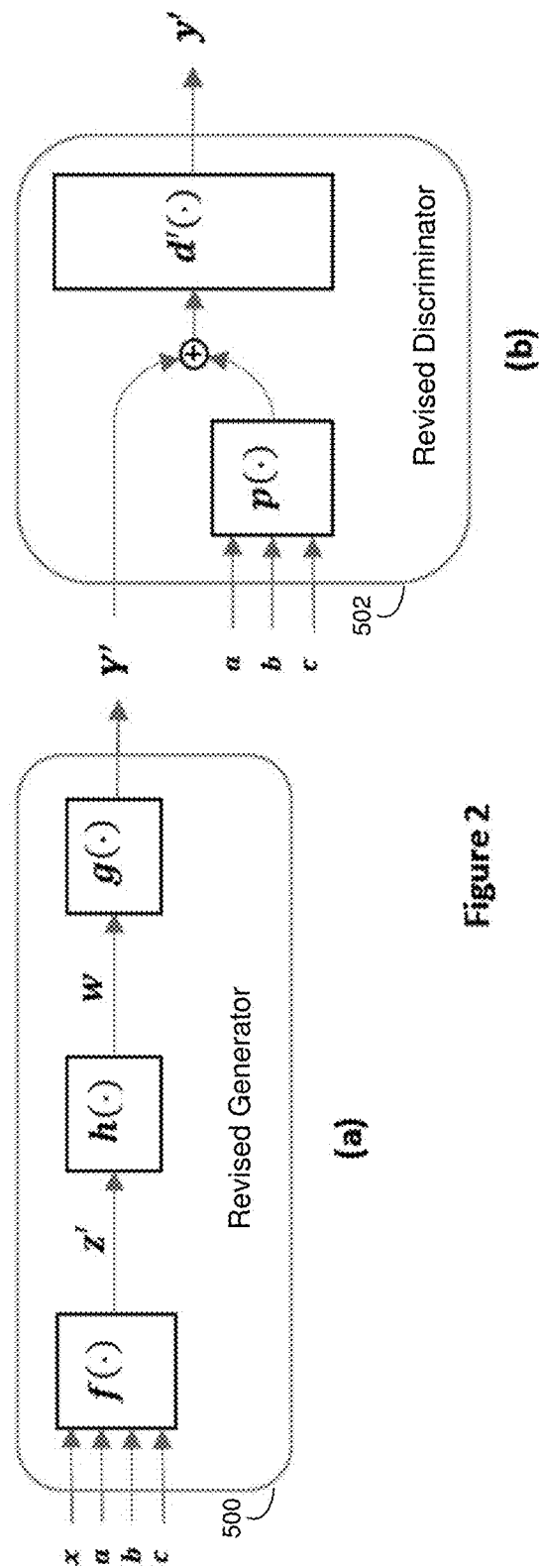
FIG. 5 is an example diagrammatic view of a revised GAN generator and a revised GAN discriminator that may be used by a facial image generator process according to one or more example implementations of the disclosure.

Referring at least to the example implementation of FIG. 5, an example revised generator 500 of FIG process 10 and a revised discriminator 502 of FIG process 10 is shown. Revised generator 500 (also referred to herein as revised GAN generator of FIG process 10) may be capable of associating generated images with a set of attributes. A new layer f(•) is introduced to compose the intermediate representation z' based on a noise vector x, and labels represented by vectors a, b, and c. While both z and w represent the image final, w is a lower level representation that is specific to the style-based architecture of StyleGAN. To allow the model to associate faces with matching demographic information, another mapping layer is introduced preceding h(•), denoted as f(•), that is referred to as the label embedding layer. In the original StyleGAN architecture, the latent code z is an input vector of noise sampled from a normal distribution. In the revised version, the latent code z is instead generated by the newly introduced label embedding layer that is a function of a noise vector sampled from a normal distribution and list of discrete labels indicating the gender, age, and ethnicity of the face being generated. The function for producing the new latent code z, which we refer to as z' in the drawings, is $f(\bullet): \mathbb{R}^{d+k} \mapsto \mathbb{R}^d$ where $$f(x,a,b,c)=|a=W^a|b \times W^b|c \times W^c$$

where $x \in \mathbb{R}^d$ is the noise vector; $a \in \mathbb{R}^2$, $b \in \mathbb{R}^3$, and $c \in \mathbb{R}^4$ are the one-hot encoded vectors for gender, age, and ethnicity respectively; $W^a \in \mathbb{R}^{2 \times k}$, $W^b \in \mathbb{R}^{3 \times k}$, and $W^c \in \mathbb{R}^{4 \times k}$ are embedding matrices for gender, age, and ethnicity respectively; x represents the matrix-vector product; | is the vector concatenation operator; and k represents the dimensionality of label embeddings. When labels a, b, and c are strictly one-hot encodings, the matrix-vector product acts as a canonical vector lookup operation where the corresponding weight matrices instead act as embedding matrices. The final generated image in the form of tensor Y'∊$\mathbb{R}^{n \times n \times 3}$ is computed via by feeding the input into the successive intermediate neural network layers; or concretely, $$Y'=g(h(f(x,a,b,c))).$$

The discriminator may be similarly conditioned on input labels, although the formulation may be simpler as less information may be needed.

Basic GAN discriminator 402 from FIG. 4 is a function of an input image, where the input is a real-numbered output indicating whether the image is real or synthetic. Here d(•) is simply an image classifier. In some implementations, the basic GAN discriminator may be defined as an abstract function $d(\bullet): \mathbb{R}^{n \times n \times 3} \mapsto \mathbb{R}$ where the input is an image and the output y is a real number between 0 and 1, with 0 indicating false and 1 indicating true with respect to whether the image is real or synthetic. Revised GAN discriminator 502 in FIG. 5 complements the revised StyleGAN generator. This discriminator uses an affine layer p(•) to map the same input labels a, b, and c to a tensor of the same dimensionality as the input image Y', and added to Y' as a fourth image channel. To provide the discriminator with label information, a strategy is used wherein this information is transformed and embedded as a fourth channel to the image. To that end, FIG process 10 may define an abstract function p(•): $\mathbb{R}^9 \mapsto \mathbb{R}^{n \times n}$, which consists of a simple affine layer (or "dense" or "fully-connected" layer) mapping a 9-dimensional vector to an $n^2$-vector that is reshaped to an n×n tensor. The output of this revised discriminator network is defined as $$y' = d'(Y'|_3 p(a|b|c))$$

where $Y' \in \mapsto^{n \times n \times 3}$ represents the input image; d'(•): $\mathbb{R}^{n \times n \times 4} \mapsto \mathbb{R}$ is a re-parameterization of d(•) that operates on 4-channel instead of 3-channel images; and $|_3$ represents an operator that corresponds to tensor concatenation along the third dimension.

Figure 6:
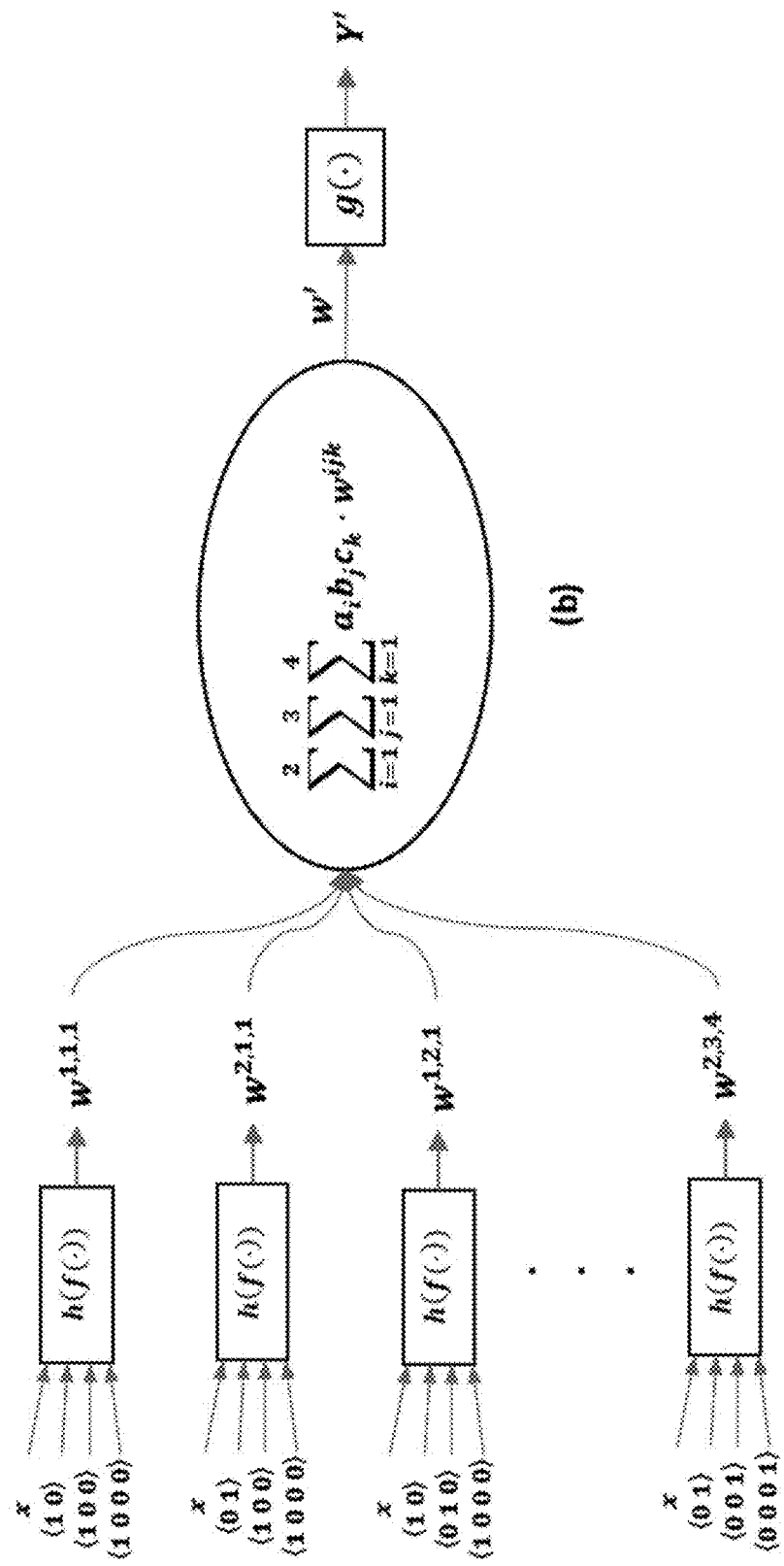
FIG. 6 is an example flowchart of a facial image generator process for generating an output image according to one or more example implementations of the disclosure.
Figure 7:
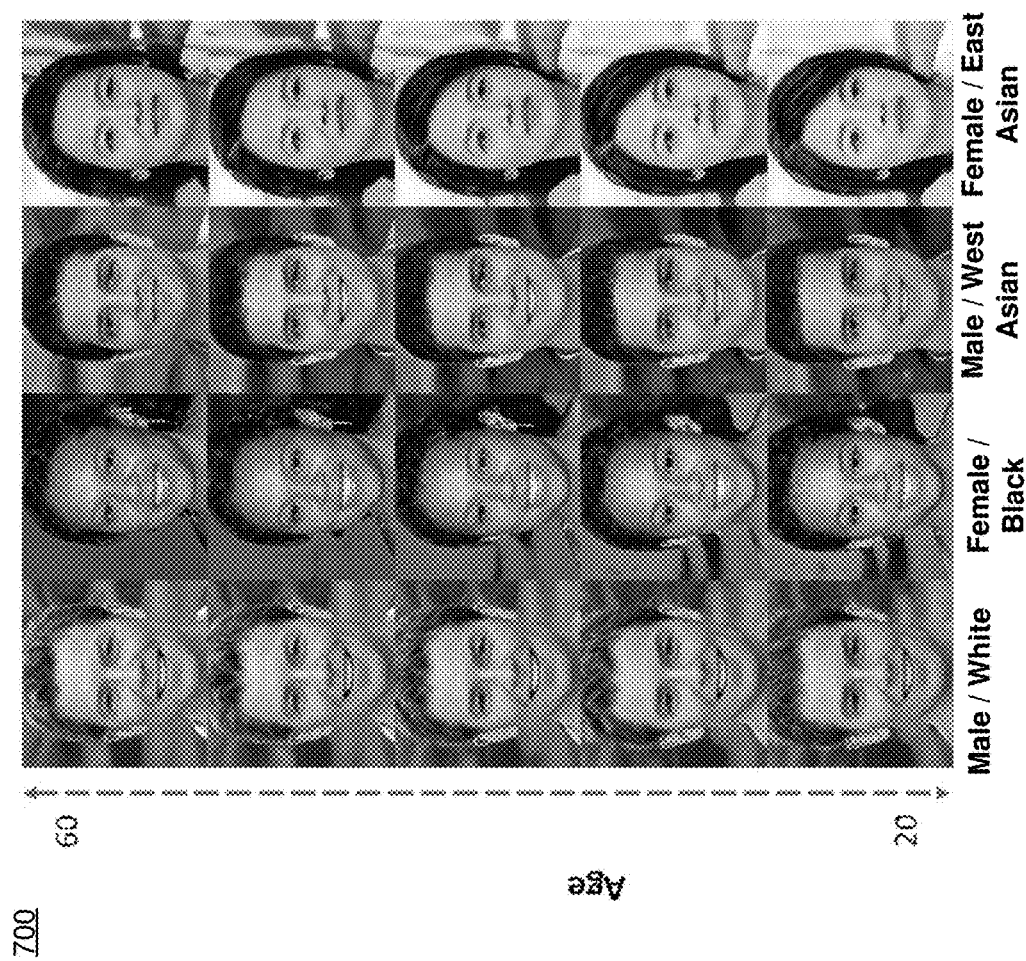
FIG. 7 is an example diagrammatic view of outputs of a facial image generator process according to one or more example implementations of the disclosure.
Figure 8:
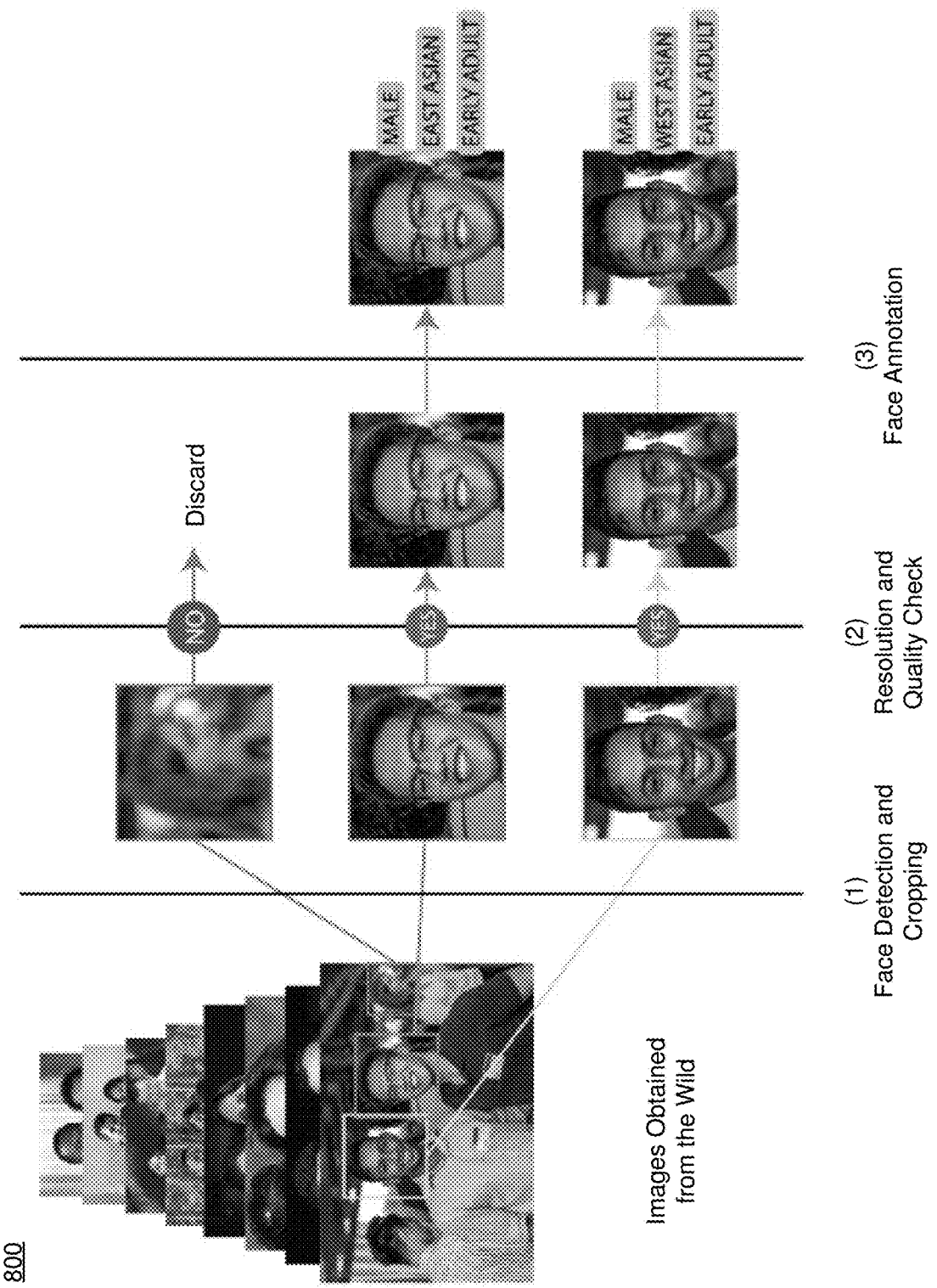
FIG. 8 is an example flowchart of a facial image generator process for collecting, curating, and annotating training examples according to one or more example implementations of the disclosure.

In some implementations, FIG process 10 may receive 304 an input of at least a portion of the plurality of demographic labels, and in some implementations, FIG process 10 may provide 306 an artificially generated facial image for display that is generated based upon, at least in part, the model and the input. For instance, and referring to the example implementation of FIG. 6, an example flowchart 600 of FIG process 10's process for generating the desired output image is shown. While it may be possible to feed the labels directly, as during training, the final blending process may occur at intermediate representation w which results in the smoothest final appearance. flowchart 600 shows the process for expanding all one-hot label combinations and generating a w' for each combination. In FIG. 6, (a) shows the process for blending the intermediate representations using a weighted sum, where combination weights are estimated based on the intersection of individual label weights, discussed more below.

In some implementations, the age may be based upon, at least in part, a weighted weighing of age labels of the plurality of demographic labels. For example, in some implementations, while a, b, and c, may be one-hot encoded during the training process, it may be possible to generate images that are an interpolation of the three classes by instead feeding the network these labels as weight distributions that sum up to 1, or $\Sigma_i u_i = 1$ for $u \in \{a, b, c\}$. For example, when training, FIG process 10 may train with a=(1,0) for male-labeled faces and a=(0,1) for female-labeled faces. However, when generating a new face, a gender-neutral face may be obtained by specifying a=(0.5, 0.5). This may also extend to age and ethnicity labels. While both latent codes z and w may be used for interpolation, interpolating in the learned w space provides a visually smoother blending in the final image. Thus, for label inputs a, b, c, and some noise vector x, we can generate an interpolated version of the latent code w, denoted w', such that $$w' = \sum_{i=1}^{2} \sum_{j=1}^{3} \sum_{k=1}^{4} a_i b_j c_k \cdot w^{i,j,k},$$

$$w^{i,j,k} = h(f(x, onehot(i, 2), onehot(j, 3), onehot(k, 4))).$$

where onehot(l,m) is a function that returns a one-hot vector of length m activated at the $l^{th}$ position. More concretely, for a fixed noise vector x, FIG process 10 may construct a version of latent w by expanding every combination of input label such that w' is a weighted sum of all expanded w terms. Since the label weights resemble probability distributions, FIG process 10 may apply the multiplication rule for independent events from probability theory to approximate an appropriate weight for each unique combination of labels. A nice property of this approach is that, referring to (b) of FIG. 6, $\Sigma_i \Sigma_j \Sigma_k a_i b_j c_k = 1$, and so no normalization is needed for the weighted summation. The final image Y' is obtained by passing w' to the synthesis layer, or Y'=g(w'). Referring to the example implementation of FIG. 7, example outputs 700 of the system is shown, with samples of faces generated varying on gender/ethnicity combination along the horizontal axis and age along the vertical axis.

Regarding translating nationality to ethnicity, in some implementations, once trained, it may be possible to perform interpolation based on input ethnicity labels to obtain a blending that resembles a face of mixed-race ancestry. Thus, it may possible to expand the ethnicity to a more comprehensive taxonomy; to avoid confusion, this broader taxonomy will be dubbed ancestry. In some implementations, the ethnicity may be based upon, at least in part, a weighted blending of ethnicity labels of the plurality of demographic labels. For example, the expanded ancestry list may minimally include European, African, Amerindian (Native Americans), Afro-Asian (mix of African and Asian ancestry), Mestizo (mix of Spanish and Indigenous descent), Mulatto (mix of European and African ancestry), Arab, Persian, Turkic, South Asian, East Asian, Southeast Asian, and Pacific Islander, although more or less ancestries may be used. This non-comprehensive list serves as a starting point that may be extended as needed. Thus, each ancestry designation may be observed as a blending of the four major ethnicity categories. For example, Afro-Asian may correspond to a face with a blending of 0% White, 50% Black, 0% West Asian, and 50% East Asian. The exact blending ratio for each ancestry may vary based on the latent space learned by each trained model and thus require manual calibration. At runtime, when a face is requested with specific nationality, FIG process 10 may map the nationality to one of the aforementioned ancestry categories by a random sampling of those ancestry categories based on a weighted distribution. The distribution is an approximation of the ethnic make-up of each country that is compiled from publicly available sources including national census data.

It will be appreciated that models other than GAN or StyleGAN models may be used without departing from the scope of the present disclosure. As such, the use of these models should be taken as example only and not to otherwise limit the scope of the present disclosure.

In some implementations, FIG process 10 may acquire and curate new training examples. For instance, in some implementations, an important challenge of training such a GAN model is the amount of quality training examples needed. An abundant amount of data is needed for model training. Attempting to train such an inherently unstable model with an insufficient number of examples overall may cause the model to diverge (i.e., "fail to learn") in an irrecoverable way. Likewise, training with insufficient number of examples per label combination may result in poor-quality generated faces and diminished control of input labels over the final output. That is, the faces generated may be flawed, have reduced diversity, or may not match up with the specified demographic labels. Each training example is an image-label pair, wherein an image of a real human face is accompanied by a set of labels describing the visually observable gender, age, and ethnicity of the aforementioned face. The method 800 of FIG process 10 described next (referring at least to the example implementation of FIG. 8) may constitute an end-to-end system and process for acquiring new training examples "from the wild." That is, it is a system of FIG process 10 that may be used to crawl publicly available image/photo hosting services and automatically (1) identify and crop face images from generic photos, (2) assess and filter face images based on image pixel-resolution and quality, and (3) annotate extracted face images with the appropriate set of labels.

The components of FIG process 10 that carry out this functionality may rely on several ML models (specifically, classifiers) including face detection, image quality classification, and facial demographic annotation. As quality of generative model outputs is directly correlated with quality of input training data, building a system that can discern between high-quality and low-quality examples may be needed. Thus, it may be important that images extracted from publicly available sources are of acceptable quality as follows. An ideal source may be from high resolution photography sharing services including, but not limited to, the popular Flickr image sharing platform. Alternatively, obtaining raw images from "crawling" the web or sourcing them from generic image hosting services that are not necessarily focused on high quality photography is still possible but less efficient due to excessive noise. This is based on the expectation that a vast majority of the raw, unfiltered images found on the open internet will not contain a human face. Choosing a source with a relatively high concentration of high-quality photos of real people may lead a better yield over time.

The first of the three major components of FIG process 10 entails face detection. Face detection is a well-studied mature subfield of computer vision, given that it is a prerequisite for many useful downstream applications. Given face detection is a mature field, many out-of-the-box solutions or tools exist that can identify faces appearing in a raw image quickly and accurately. As such, the details of such tools are out of scope with respect to this disclosure. Such tools detect and localize faces in the form of bounding box coordinates, which is information that may be used in the cropping step. Before cropping, faces may be re-aligned via transformations, including rotations and shears, so that "landmarks" such as the eyes, nose, and mouth line up and are arranged in a predictable location and orientation. This is a minor detail which may help ease the GAN training process, but not essential to the overall process. Finally, cropping may be applied based on the bounding boxes coordinates to obtain the final candidate face image.

In some implementations, FIG process 10 may determine 308 whether a candidate face image is acceptable for use as one of the plurality of facial images to train the model based upon, at least in part, at least one of whether the candidate face image is a real human face and one or more attributes of the candidate face image. For instance, and referring still at least to the example implementation of FIG. 8, an example of the end-to-end process 800 of FIG process 10 for automatically collecting, curating, and annotating new, high-quality training examples for the GAN model by analyzing raw images found on the open internet is shown. The second component of FIG process 10 is a quality assurance system that analyzes candidate face images extracted by the first component and decides whether or not they should be kept or discarded based on a set of acceptability criteria. Examples of unacceptable images may include, e.g., low-resolution, blurry, or grainy images. Other important details may include undesirable lighting and coloration, e.g., poorly-lit photos or monotone photos may also be discarded for this reason. Lastly, face detection may be imperfect, and may oftentimes detect non-human faces including faces of dolls, statues, or computer-generated ("CGI") figures. Similarly, faces that were artistically rendered such as paintings or drawings may not be desirable and may therefore be discarded. Other practical issues may also arise, such as faces that are full or partially obstructed by objects in the foreground or articles of clothing such as scarfs or masks. Thus, a machine learning classifier of FIG process 10 may be designed and trained specifically for the task of determining whether the image is suitable based on the previously described set of criteria. Deep neural network architectures used for this task may include state-of-the-art computer vision models such as Residual Neural Networks. Training data may be acquired by sampling images extracted by the first component and manually labeling each as Yes/No with respect to acceptability. It may also be possible to instead annotate them using a tiered system to denote level of quality. It is estimated that the minimum number of examples needed to obtain reasonable accuracy for this ML model is on the scale of thousands.

In some implementations, the model may be trained to automatically assign the demographic labels to the plurality of facial images. For instance, and referring at least to the example implementation of FIG. 9, an example interface 900 for FIG process 10 to manually annotate faces with labels for the purpose of training a machine learning classifier is shown, that may be able to automatically classify new and unseen faces. The form may be pre-populated with "suggestions" based on what the model has learned so far, which may ease the manual annotation process. The example third component of FIG process 10 (shown in FIG. 8) may be responsible for automatically annotating face images extracted and deemed acceptable by the second component. The exact range of labels for these attributes including gender, age, and ethnicity is as described earlier. Given the sparse nature of the problem, it is estimated that the minimum number of training examples needed to obtain reasonable accuracy is on the scale of tens of thousands. Thus, a user-friendly annotation tool may be desirable for manually annotating faces that may be used as training data. Such a platform may allow for rapid crowdsourcing of human annotations. Once enough training data is collected, it may be used to train a machine learning model that is able to assign labels to faces automatically without further human intervention. This model may again be based on Residual Neural Networks or other comparable deep neural architectures for computer vision. As human-contributed annotations are costly and labor intensive, partially trained models may be used to pre-populate the annotation tool with label "suggestions" for new examples. This is expected to ease the burden on the human annotator. New annotations may be used to re-train and re-calibrate the model such that the suggestions are better each time a new annotation is added. Thus, the annotation tool that is expected to be more efficient over time with human annotators eventually taking a more passive role in the data annotation process as suggestions become more precise. Once enough data has been collected that the intermediate models have reached a reasonable level of accuracy, the entire pipeline may run indefinitely and autonomously without further human intervention.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A and B" (and the like) as well as "at least one of A or B" (and the like) should be interpreted as covering only A, only B, or both A and B, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
analyzing, by a computing device, a plurality of facial images to determine a plurality of demographic labels associated with each facial image of the plurality of facial images;
training a model based upon, at least in part, the plurality of demographic labels associated with each facial image of the plurality of facial images, wherein the model is a generative adversarial network (GAN) with a generator and a discriminator, wherein the generator includes a label embedding layer that processes a one-hot encoded vector for each of the demographic labels, wherein the discriminator includes an affine layer that processes a tensor for each of the demographic labels;
receiving an input of at least a portion of the plurality of demographic labels; and
providing an artificially generated facial image for display that is generated based upon, at least in part, the model and the input.

2. The computer-implemented method of claim 1 wherein the demographic labels include at least one of a gender, an age, and an ethnicity.

3. The computer-implemented method of claim 2 wherein the age is based upon, at least in part, a weighted blending of age labels of the plurality of demographic labels.

4. The computer-implemented method of claim 2 wherein the ethnicity is based upon, at least in part, a weighted blending of ethnicity labels of the plurality of demographic labels.

5. The computer-implemented method of claim 1 wherein the plurality of facial images are automatically selected for analysis from an internet.

6. The computer-implemented method of claim 1 further comprising determining whether a candidate face image is acceptable for use as one of the plurality of facial images to train the model based upon, at least in part, at least one of whether the candidate face image is a real human face and one or more attributes of the candidate face image.

7. The computer-implemented method of claim 1 wherein the model is trained to automatically assign the demographic labels to the plurality of facial images.

8. A computer program product residing on a non-transitory computer readable storage medium having a plurality of instructions stored thereon which, when executed across one or more processors, causes at least a portion of the one or more processors to perform operations comprising:
analyzing a plurality of facial images to determine a plurality of demographic labels associated with each facial image of the plurality of facial images;
training a model based upon, at least in part, the plurality of demographic labels associated with each facial image of the plurality of facial images, wherein the model is a generative adversarial network (GAN) with a generator and a discriminator, wherein the generator includes a label embedding layer that processes a one-hot encoded vector for each of the demographic labels, wherein the discriminator includes an affine layer that processes a tensor for each of the demographic labels;
receiving an input of at least a portion of the plurality of demographic labels; and
providing an artificially generated facial image for display that is generated based upon, at least in part, the model and the input.

9. The computer program product of claim 8 wherein the demographic labels include at least one of a gender, an age, and an ethnicity.

10. The computer program product of claim 9 wherein the age is based upon, at least in part, a weighted blending of age labels of the plurality of demographic labels.

11. The computer program product of claim 9 wherein the ethnicity is based upon, at least in part, a weighted blending of ethnicity labels of the plurality of demographic labels.

12. The computer program product of claim 8 wherein the plurality of facial images are automatically selected for analysis from an internet.

13. The computer program product of claim 8 wherein the operations further comprise determining whether a candidate face image is acceptable for use as one of the plurality of facial images to train the model based upon, at least in part, at least one of whether the candidate face image is a real human face and one or more attributes of the candidate face image.

14. The computer program product of claim 8 wherein the model is trained to automatically assign the demographic labels to the plurality of facial images.

15. A computing system including one or more processors and one or more memories configured to perform operations comprising:
analyzing a plurality of facial images to determine a plurality of demographic labels associated with each facial image of the plurality of facial images;

training a model based upon, at least in part, the plurality of demographic labels associated with each facial image of the plurality of facial images, wherein the model is a generative adversarial network (GAN) with a generator and a discriminator, wherein the generator includes a label embedding layer that processes a one-hot encoded vector for each of the demographic labels, wherein the discriminator includes an affine layer that processes a tensor for each of the demographic labels;

receiving an input of at least a portion of the plurality of demographic labels; and providing an artificially generated facial image for display that is generated based upon, at least in part, the model and the input.

16. The computing system of claim 15 wherein the demographic labels include at least one of a gender, an age, and an ethnicity.

17. The computing system of claim 16 wherein the age is based upon, at least in part, a weighted blending of age labels of the plurality of demographic labels.

18. The computing system of claim 16 wherein the ethnicity is based upon, at least in part, a weighted blending of ethnicity labels of the plurality of demographic labels.

19. The computing system of claim 15 wherein the plurality of facial images are automatically selected for analysis from an internet.

20. The computing system of claim 15 wherein the operations further comprise determining whether a candidate face image is acceptable for use as one of the plurality of facial images to train the model based upon, at least in part, at least one of whether the candidate face image is a real human face and one or more attributes of the candidate face image.

21. The computing system of claim 15 wherein the model is trained to automatically assign the demographic labels to the plurality of facial images.

* * * * *